3,306,871
SYNTHETIC LATEXES COMPRISING ar-MONO-
VINYL AROMATIC SULFONIC ACID SALT-
STYRENE-BUTADIENE TERPOLYMERS
Frederick A. Miller, Midland, Mich., assignor to The Dow
Chemical Company, Midland, Mich., a corporation of
Delaware
No Drawing. Filed Mar. 26, 1964, Ser. No. 355,092
2 Claims. (Cl. 260—29.7)

This application is a continuation-in-part of my copending application for Letters Patent, Serial No. 841,702, filed September 23, 1959, and now abandoned.

This invention concerns certain new synthetic polymer latexes wherein the polymer comprises an ar-monovinyl aromatic sulfonic acid salt copolymerically combined therein as anionic stabilizer.

The synthetic latexes which are provided by this invention are aqueous dispersions of addition polymers of ethylenically unsaturated monomers including a salt of an ar-monovinyl aromatic sulfonic acid in amount corresponding to from 0.5 to 3.0 weight percent calculated as the sodium form based on the total weight of the polymer.

The sulfonic acid salt constituent of the polymer is a salt of an ar-monovinyl aromatic hydrocarbon sulfonic acid or nuclear halogenated ar-monovinyl aromatic hydrocarbon sulfonic acid wherein the sulfonic acid group is attached to the aromatic nucleus directly as in p-styrenesulfonic acid or through a methylene group as in p-vinylbenzyl sulfonic acid. These sulfonic acid salts are representable by the general formula

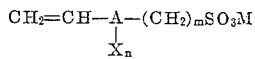

wherein A is an aromatic hydrocarbon nucleus such as a nucleus of benzene, naphthalene, biphenyl, indane, etc., X is an alkyl, cycloalkyl, or halogen substituent on the aromatic hydrocarbon nucleus, $n$ is an integer from 0 to 4, $m$ is an integer from 0 to 1, and M is a salt-forming cation. Any salt of an ar-monovinyl aromatic sulfonic acid which is soluble in water to form a solution containing at least 3 weight percent of the salt can be used as a starting material in making the copolymer latexes. Specific examples of suitable ar-monovinyl aromatic sulfonate salts, for purpose of illustration and not of limitation, are the sodium, potassium, calcium, ammonium, and amine salts of ar-styrenesulfonic acid, ar-vinyltoluenesulfonic acid, ar-vinylxylenesulfonic acid, ar-vinylchlorobenzenesulfonic acid, ar-vinylnaphthalenesulfonic acid, ar-vinylbenzyl sulfonic acid (ar-vinyl-α-toluene sulfonic acid), and ar-vinyl-α-xylene sulfonic acid. Preferred are salts of styrenesulfonic acid and of ar-vinylbenzyl sulfonic acid.

The bulk of the polymer, preferably at least 95 mole percent exclusive of the sulfonic acid salt constituent, is composed of units corresponding to non-ionic ethylenically unsaturated monomers of which at least a substantial portion, e.g., at least 10 mole percent, has a terminal ethylenic group attached by a single bond to a non-aromatic carbon atom that is multiple bonded to another atom having atomic number from 6 to 8, i.e., a carbon atom, a nitrogen atom, or an oxygen atom. Such molecular configurations are supplied in compounds having the general formula R—Y wherein R is a vinyl or alpha-substituted vinyl radical and Y is a vinyl radical, alpha-substituted vinyl radical, alkynyl radical, cyano radical or carbonyl radical (as in formyl, acyl, carbalkoxy, or carbamyl). Specific examples of such monomers, for purpose of illustration and not of limitation, are methyl methacrylate, ethyl acrylate, hexyl acrylate, lauryl methacrylate, phenyl acrylate, glycol dimethacrylate, glycidyl methacrylate, ethyl α-chloroacrylate, acrylonitrile, methacrylonitrile, acrylanilide, vinylmethyl ketone, methyl isopropenyl ketone, 1,3-butadiene, isoprene, 2,3-dimethyl-1,3-butadiene, and chloroprene. Preferred are 1,3-butadiene, acrylonitrile, alkyl acrylates, and alkyl methacrylates. Mixtures of two or more of such monomers can be used.

The starting monomer mixture can also contain additional polymerizable ethylenically unsaturated monomers, including, for example, vinyl aromatic hydrocarbons, such as styrene, α-methylstyrene, ar-methylstyrene, ar-ethylstyrene, α,ar-dimethylstyrene, ar,ar-dimethylstyrene, divinylbenzene, vinylnaphthalene, and divinylnaphthalene, and derivatives thereof, such as ar-methoxystyrene, ar-cyanostyrene, ar-acetylstyrene, ar-monochlorostyrene, ar-dichlorostyrene and other ar-halostyrenes; vinyl esters, such as vinyl acetate, vinyl propionate, vinyl butyrate, and vinyl benzoate; maleic esters such as diethyl maleate; vinyl chloride, vinyl bromide, vinylidene chloride, vinylidene bromide, and vinyl ethyl ether. Vinylaromatic hydrocarbons are preferred. Small proportions, e.g., up to 5 mole percent of the polymer units exclusive of the sulfonic acid salt constituent, of anionic monomers can also be used, particularly those having ethylenic unsaturation in conjugation with the carboxylic acid group, such as acrylic acid, methacrylic acid, and itaconic acid.

The amount of ar-monovinyl aromatic sulfonic acid salt preferably corresponds to from approximately 0.5 to 3.0 weight percent, calculated as the sodium form, based on the weight of the polymer. When other than sodium salts are used, the amounts are selected in proportion to the molecular weight relative to the sodium salt for comparable effect. When the latex contains a film-forming copolymer of styrene and 1,3-butadiene without a conventional water-soluble emulsifier, the polymer preferably contains from 0.5 to 1.5 weight percent of the ar-monovinyl aromatic sulfonic acid salt, calculated as the sodium salt based on the weight of the polymer, to obtain water-resistant dry films from such latexes.

Specific examples of copolymer latexes in accordance with this invention are copolymers of from 97 to 99.5 parts by weight of a mixture of styrene and 1,3-butadiene and from 0.5 to 3.0 parts by weight of sodium ar-styrenesulfonate or sodium ar-vinylbenzylsulfonate, the styrene: butadiene ratio being from 10:90 to 90:10, by weight and preferably from 10:90 to 70:30 when the latex is to be film-forming; copolymers like the foregoing wherein the amount of ar-vinyl aromatic sulfonic acid salt and the amount of non-polymerizable emulsifier are limited and related as hereinbefore described; copolymers like the foregoing wherein a part or all of the styrene is replaced by ar-vinyltoluene; copolymers like the foregoing in which a part or all of the styrene or ar-vinyltoluene is replaced by acrylonitrile; copolymers of (parts by weight) styrene (60), 1,3-butadiene (25), acrylonitrile (15), and sodium styrenesulfonate (1); and copolymers of styrene (60), 1,3-butadiene (25), acrylonitrile (15), methacrylic acid (2), divinylbenzene (1), and sodium styrenesulfonate (1).

These synthetic latexes are prepared by aqueous emulsion polymerization of the corresponding monomers with free radical-generating catalysts in the presence or absence of conventional anionic or non-ionic emulsifying agents. The aqueous emulsion polymerization of the specified monomers is advantageous in that the rate of polymerization is increased by the presence and participation of the ar-monovinyl aromatic sulfonic acid salts. The resulting latexes are exceptionally stable against coagulation by mechanical agitation. Those that contain little or no conventional emulsifier are non-foamy. In instances where the copolymer is film-forming or is rendered film-forming by plasticization, the dried films are often very resistant to water, and the moisture vapor transmission rates are low and the tensile strengths are high relative to conventional polymers lacking the copolymerized ar-vinylaromatic sulfonic acid constituent.

Remarkable products are obtained when the latex polymer is a film-forming polymer of styrene, 1,3-butadiene, and the ar-monovinyl aromatic sulfonic acid salt in amount corresponding to from 0.5 to 1.5 weight percent calculated as the sodium form based on the total weight of the polymer and there is no water-soluble surfactant present in the latex. When such latexes are cast in thin layers on solid supporting surfaces and dried by evaporation of water therefrom, dry films are obtained which are unexpectedly resistant to water. Moreover, remarkably water-resistant dry films or sheets are obtained from latexes wherein the styrene-butadiene polymer contains more than 1.5 (up to 3) weight percent of the ar-monovinyl aromatic sulfonic acid salt and the latexes contain up to 5 weight percent of water-soluble surfactant, even though, within such ranges, an increase in the proportion of either the ar-monovinyl aromatic sulfonic acid salt or the water-soluble surfactant alone, without the other, tends to make the dry film products more water sensitive. Furthermore, the foaminess of latexes made with conventional water-soluble surfactants is markedly suppressed by a concurrent use of the ar-monovinyl aromatic sulfonic acid salt comonomeric emulsifiers.

The synthetic latexes of this invention are prepared by bringing the above-mentioned monomeric materials, in the proportions theoretically required to form the copolymers, together with the water, catalyst and polymerization modifiers as desired to form an emulsion polymerization charge.

The polymerization is initiated and promoted by a free radical-generating catalyst. Suitable water-soluble catalysts are peroxygen compounds, such as hydrogen peroxide, potassium persulfate, sodium persulfate, and ammonium persulfate, with or without a reducing agent such as sodium bisulfite and sodium thiosulfate. Suitable oil-soluble free radical-generating catalysts are dibenzoyl peroxide, dilauroyl peroxide, cumene hydroperoxide, and tert.-butyl hydroperoxide, activated by water-soluble activators such as reducible sulfur compounds, e.g. sodium formaldehyde sulfoxylate, polyalkylenepolyamines, or ions of heavy metals, e.g. ferrous or ferric iron. Other suitable catalysts are azo compounds such as $\alpha,\alpha$-azobisisobutyronitrile. Mixtures of catalysts can be used. The catalyst is employed in amount conventional for emulsion polymerization, usually from 0.05 to 2 percent of the combined weight of the polymerizable monomers, although larger or smaller amounts can be used.

The polymerization can be carried out in the absence of conventional non-polymerizable emulsifying agents, but anionic or nonionic surface-active agents can be used if desired. If such agents are used, anionic emulsifiers are preferred, such as fatty acid soaps, e.g., sodium stearate, sodium oleate, sodium palmitate, sodium myristate, or the corresponding potassium or amine base soaps, long chain alkyl sulfates, e.g., sodium lauryl sulfate, sodium myristyl sulfate, or the corresponding potassium alkyl sulfates, surface active alkylarylsulfonates such as sodium dodecylbenzenesulfonate and sodium alkylnaphthalenesulfonates, sodium dioctylsulfosuccinate, and the like. The conventional, non-polymerizable surface-active agent, if used, is used in amount not exceeding approximately 5 percent of the combined weight of the polymerizable monomers lest the action of such conventional surfactant in causing formation of foam in the latex, rendering the dried latex products water-sensitive, etc., obscure the advantages of the polymerized sulfonic acid constituent in the latexes.

The emulsion polymerization is effected by heating the mixture of starting materials at temperatures of from 30° to 120° C., preferably with agitation while preventing free access of air, e.g., in a closed vessel under an atmosphere of nitrogen, to form a latex of the colloidally dispersed copolymer. Latexes are made having up to about 60 percent, preferably up to about 50 percent, by weight of colloidally dispersed polymer solids by selection of the starting proportions of aqueous phase and monomers or by selection of the degree of polymerization. The polymerization is carried to substantial completion or is terminated prior thereto, e.g., by addition of catalyst-inactivating agents. Unreacted monomers in the latex products can be removed in conventional manner, e.g., by steam distillation. Any non-colloidal solid matter in the latex can be removed by filtration or centrifugation.

The following examples illustrate the invention, but are not to be construed as limiting its scope. In the examples, the "styrenesulfonic acid" which was used was approximately 90 weight percent the para-isomer, the remainder being mostly the ortho-isomer. The p-vinylbenzyl sulfonic acid contained only traces of other isomers. In place of the particular materials used in the examples, other isomers and other ar-monovinyl aromatic sulfonic acid salts are used with similar results.

*Example 1*

An aqueous mixture for emulsion polymerization was prepared as follows:

| | Grams |
|---|---|
| Water | 1584 |
| Surfactant (sulfated mixture of lauryl and myristyl alcohols, sodium salt, containing $Na_2SO_4$) | 6.6 |
| Potassium persulfate | 13.2 |
| Sodium bicarbonate | 9.5 |
| Sodium p-vinylbenzylsulfonate | 25.0 |

The aqueous solution was placed in a polymerization reactor and chilled to ice temperature. The atmosphere in the reactor was displaced by nitrogen, and a monomer mixture of 600 grams of styrene and 400 grams of 1,3-butadiene was added. The reactor was closed and the reaction mixture was agitated at 70° C. for three hours. After cooling, the reactor was opened, and the latex was removed.

The resulting latex contained approximately 38 percent by weight of colloidally dispersed copolymer solids having average particle diameter of about 1600 A. There was very little polymer coagulum in either the latex or the reactor. The latex had very little foaming tendency.

A portion of the latex was subjected to steam distillation without addition of further stabilizer. There was very little foaming and little formation of sludge.

Thin layers of the latex were dried on glass to adherent and coherent films. Several drops of water were placed on the dried films. After 24 hours of such water spotting, the film was only slightly whitened, and the adhesion to the glass beneath the water spot was still excellent, showing the excellent resistance of this copolymer product to water.

*Example 2*

A series of polymerization runs, identified as 2A, B, C, and D, respectively, was made with various proportions of sodium styrenesulfonate as comonomeric emulsifier.

In each run, an aqueous charge was prepared as follows:

| | Grams |
|---|---|
| Water | 150 |
| Surfactant (sulfated mixture of lauryl and myristyl alcohols, sodium salt, containing $Na_2SO_4$) | 0.66 |
| Potassium persulfate | 1.32 |
| Sodium bicarbonate | 0.96 |

To the separate solution of Runs B, C, and D was added sodium styrenesulfonate in amounts of 0.4, 1.0, and 1.5 grams, respectively. No sodium styrenesulfonate was added in Run A.

In each instance, the resulting solution was placed in a polymerization reactor and cooled to ice temperature. A solution of 60 grams of styrene and 40 grams of 1,3-butadiene was then added, the atmosphere in the reactor was flushed out with nitrogen, and the reactor was closed. The reaction mixture was heated with agitation at 70° C. for the times shown in Table 1. The table shows the the "Latex Recovery" which is the weight in grams of polymer obtained in latex form from the 100 grams of starting monomers. The "Hamilton-Beach Stability" is a conventional measure of mechanical stability obtained by subjecting 50 ml. of the latex in an 8-ounce cylindrical bottle to the vigorous agitation of a "Hamilton-Beach" malted milk mixer and is expressed as the time in minutes required to coagulate the polymer. The "Water Resistance" was obtained by drying thin layers of the latexes on glass plates to obtain 10-mil dried films, placing a small pool of water on the dried film, and observing the effect of the water on the clarity of the film and on the adhesion of the film to the glass.

TABLE 1

| Run | 2A | 2B | 2C | 2D |
|---|---|---|---|---|
| Sodium styrenesulfonate, grams | None | 0.5 | 1.0 | 1.5 |
| Polymerization time, hours (at 70° C.) | 6.5 | 5.5 | 4.5 | 5.5 |
| Latex recovery | 96 | 98 | 97 | 90 |
| Particle diameter, microns | 0.140 | 0.110 | 0.110 | 0.145 |
| Hamilton-Beach stability, mins | 2.75 | 8–11 | 21–23 | >30 |
| Water resistance | (1) | (1) | (2) | (1) |

[1] Good.  [2] Very good.

It will be noted that Run 2A was carried out as a control, without added sodium styrenesulfonate, for purpose of contrast with Runs 2B, 2C, and 2D, and is itself not exemplary of the present invention. The latex products of Runs 2B, 2C, and 2D are seen to be much more stable than that of the control Run 2A.

Portions of the latexes 2B, 2C, and 2D were readily steam distilled without additional stabilizers and with formation of very little foam.

*Example 3*

Another series of polymerization runs, identified as 3A, B, C, and D, respectively, was carried out with the same kind of changes and by the same kind of procedure as described for Example 2 except that in place of sodium styrenesulfonate there was used sodium p-vinylbenzylsulfonate in amounts of 0.0, 1.0, 2.0, and 3.0 grams, respectively, and the polymerizations were carried out at 50° C. The results are shown in Table 2.

TABLE 2

| Run | 3A | 3B | 3C | 3D |
|---|---|---|---|---|
| Sodium p-vinylbenzylsulfonate, grams | None | 1.0 | 2.0 | 3.0 |
| Polymerization time, hours (at 50° C.) | 29 | 16.5 | 14.5 | 13.5 |
| Latex recovery | 92 | 97 | 99 | 99 |
| Particle diameter, microns | 0.145 | 0.08 | 0.08 | 0.15 |
| Hamilton-Beach stability, mins | 0.33 | 6–7 | >20 | >30 |
| Water resistance | (1) | (2) | (2) | (2) |

[1] Good.  [2] Excellent.

It will be noted that Run 3A was carried out as a control, without any added sodium ar-vinylbenzylsulfonate, for purpose of contrast with Runs 3B, 3C, and 3D, and is itself not exemplary of the present invention.

By comparing the polymerization time required for Runs 3B, C, and D, especially the latter, with that required for the control Run 3A, it will be seen that the rate of polymerization was increased and the reaction time shortened by including the sodium ar-vinylbenzylsulfonate in the charge. The latex products of Runs 3B, 3C, and 3D are seen to be much more stable than that of the control Run 3A and have excellent water resistance.

*Example 4*

An aqueous solution for emulsion polymerization was prepared as follows:

|  | Grams |
|---|---|
| Water | 933 |
| Surfactant, sodium salt of di(2-ethylhexy) sulfosuccinate, 50 percent active | 1 |
| Sodium formaldehyde sulfoxylate | 1.5 |
| Acetic acid | 1.0 |
| Sodium hydroxide to pH 4.0. | |

The solution was placed in a polymerization reactor vessel equipped with stirrer, thermometer, gas inlet tube, dropping funnel, and means for heating and for cooling. The atmosphere above the charge was flushed out with nitrogen, and the solution was heated to 80° C. There was then added 78.1 grams of an aqueous solution of 11.4 grams of sodium styrenesulfonate. While holding the temperature at 80° C. and with stirring, there was added dropwise, over a period of 7.85 hours, a mixture of the following:

|  | Grams |
|---|---|
| Methyl methacrylate | 800 |
| 2-ethylhexyl acrylate | 200 |
| Cumene hydroperoxide (70 percent) | 0.715 |

The resulting latex contained 51 percent by weigtht of colloidally dispersed copolymer and only 4 grams of solids collectable on a filter, and was mechanically very stable.

In order to make the latex film-forming, the dispersed polymer was plasticized by adding to the latex an emulsion of diethylene glycol monobutyl ether acetate. To 300 grams of the above latex were added 1.6 ml. of 10 percent by weight potassium hydroxide (making the pH 7.8) and 75 grams of an emulsion composed as follows:

|  | Grams |
|---|---|
| Diethylene glycol monobutyl ether acetate | 100 |
| Surfactant, mono(ar-octylphenyl)ether of polyethylene glycol having from 9 to 10 ethoxy units | 1 |
| Water | 100 |

A portion of the resulting plasticized polymer latex was subjected to vigorous agitation in the conventional Hamilton-Beach Stability Test and did not show any signs of coagulation after 20 minutes of such agitation.

*Example 5*

An emulsion polymerization reaction mixture was composed as follows:

|  | Parts of weight |
|---|---|
| Water | 150 |
| Sodium styrenesulfonate | 0.75 |
| Hydrochloric acid | 0.04 |
| Ferric nitrate | 0.0065 |
| Hydrogen peroxide | 0.75 |
| Methyl methacrylate | 10 |
| 2-ethylhexyl acrylate | 30 |
| Vinyl acetate | 110 |

The charge was heated with agitation at 70° C. for 3 hours and cooled to obtain a stable, non-foamy latex containing 38 percent by weight of colloidally dispersed polymer solids, the average particle diameter being approximately 0.12 micron.

Examples 6–34

A series of aqueous emulsion polymerizations was carried out in citrate bottles tumbled in a water bath at 70° C. until polymerization was substantially complete.

The compositions of the charges, in parts by weight, are shown in Table 3 as to the water, catalyst, pH buffer, and monomers and in Table 4 as to the amount of sodium styrenesulfonate and as to the kind and amount of conventional anionic emulsifier. The runs in Examples 9, 12, 17, 20, 23, 26, 29, 31, and 33 were carried out for purpose of comparison, without any added sodium styrenesulfonate, and are not exemplary of the present invention.

In each instance where a latex product was obtained, the sensitivity of the dried film product to water was quantitatively measured in the following way. About 0.5 ml. of the latex product was placed in a uniform layer on a rectangular glass plate 5.2 cm. by 4.4 cm. and dried at room temperature for 24 hours. The glass plate and its polymer film were then placed in a rectangular cuvette, 0.5 cm. x 3.2 cm. x 5.2 cm. The cuvette was filled with water to immerse the polymer film and was then placed in a colorimeter ("Lumetron," Model 402–E). The percentage of white light transmitted by the film was immediately measured and again after 20 minutes (two minutes in Examples 29–34). The difference between such percentage transmissions was recorded as ΔT in Table 4. Since water-sensitive films whiten and become opalescent under the conditions employed, the ΔT value is a quantitative measure of such water-sensitivity. Low values of ΔT indicate water-resistant products.

In instances where latex products were obtained, the stability of such products to mechanical agitation was measured in the following way. The test was carried out in a cylindrical nickel tube 1.625 inches in diameter and 5.625 inches high, closed with a flat bottom and containing a stirrer in the form of a solid cylinder 1.5 inches in diameter, 3 inches long, clearing the bottom of the tube by 0.0625 inch, and rotating concentrically within the tube at 2700 revolutions per minute. The latex was tested by putting 10 grams thereof in the apparatus and stirring at room temperature. After a measured time, $t$, the amount of coagulum formed in the latex was determined by collecting, drying, and weighing such coagulum, and the value, $c$, was calculated as the percent by weight of the starting latex polymer solids which was collected as coagulum after time $t$. From these data, the value $p$ was calculated in the equation $$p = \frac{t}{(c)^{1/3}}$$

The values of $p$ for the examples are shown in Table 4. Higher values of $p$ indicate greater relative mechanical stability of the latexes.

TABLE 3

| Examples | Water | Potassium persulfate | Sodium bicarbonate | Styrene | 1,3-Butadiene | Acrylonitrile |
|---|---|---|---|---|---|---|
| 6–14 | 150 | 0.65 | 0.47 | 60 | 40 | |
| 15–16 | 150 | 1.32 | 0.95 | 60 | 40 | |
| 17–28 | 150 | 0.65 | 0.47 | 60 | 40 | |
| 29–32 | 150 | 0.65 | 0.47 | | 70 | 30 |
| 33–34 | 150 | 0.65 | 0.47 | 20 | 80 | |

TABLE 4

| Example | Sodium Styrenesulfonate | Anionic Emulsifier | ΔT | P |
|---|---|---|---|---|
| 6 | 0.5 | None | 1.5 | 4.5 |
| 7 | 1.0 | ----do---- | 0 | 6.5 |
| 8 | [6] 2.0 | ----do---- | 16 | 3.6 |
| 9 | None | [1] 0.1 | 6.5 | 0.1 |
| 10 | 0.25 | [1] 0.1 | 14.0 | 0.7 |
| 11 | 2.0 | [1] 0.1 | 0.5 | 4.4 |
| 12 | None | [1] 2.64 | 4.0 | 1.7 |
| 13 | 3.0 | [1] 2.64 | 1.0 | 16.7 |
| 14 | 2.0 | [1] 0.66 | 0.3 | 5.0 |
| 15 | 2.0 | [1] 0.66 | 4.5 | 9.7 |
| 16 | 2.0 | [1] 1.0 | 1.5 | 2.4 |
| 17 | None | [2] 0.1 | 26.0 | 0.1 |
| 18 | 0.25 | [2] 0.1 | 13.5 | 1.7 |
| 19 | 2.0 | [2] 0.1 | 0.3 | 4.0 |
| 20 | None | [3] 0.1 | 8.7 | 0.2 |
| 21 | 0.25 | [3] 0.1 | 9.0 | 4.9 |
| 22 | 2.0 | [3] 0.1 | 0 | 5.9 |
| 23 | None | [4] 0.1 | No latex product | No data |
| 24 | 0.25 | [4] 0.1 | 12.0 | 7.6 |
| 25 | 2.0 | [4] 0.1 | 1.5 | 0.3 |
| 26 | None | [4] 1.0 | 2.5 | 2.1 |
| 27 | 0.25 | [4] 1.0 | 5.5 | 30 |
| 28 | 2.0 | [4] 1.0 | 5.0 | 0.06 |
| 29 | None | [1] 0.1 | [5] 3.5 | 1.4 |
| 30 | 2.0 | [1] 0.1 | [5] 2.5 | |
| 31 | None | [1] 0.66 | No latex product | |
| 32 | 1.5 | [1] 0.66 | [5] 1.5 | 4.1 |
| 33 | None | [1] 0.1 | [5] 1.5 | 0.1 |
| 34 | 2.0 | [1] 0.1 | [5] 1.0 | 2.1 |

[1] Sulfated mixture of lauryl and myristyl alcohols, sodium salt, technical grade, 66 percent assay, containing sodium sulfate.
[2] Sulfated mixture of lauryl and myristyl alcohols, sodium salt, puified 91 percent assay.
[3] Sodium dodecylbenzenesulfonate, 98 percent assay.
[4] Sodium stearate.
[5] ΔT observed after 2 minutes.
[6] Without added emulsifier in the latex, water-resistant dried film products are obtained when the latex polymer of styrene and butadiene contains a maximum of about 1.5 weight percent of sodium styrenesulfonate; but compare with Examples 11, 13, 14, 19, and 22.

It will be seen from a comparison of these examples that, in any one kind of system, there is often an optimum proportion of the sodium styrenesulfonate comonomer that produces the most water-resistant dry film product (Example 7 in 6–8; 11 in 9–11; 13 in 12–13; 19 in 17–19; 22 in 20–22; 25 in 23–25). It will also be seen from these comparisons that, up to such optimum amount, the addition of sodium styrenesulfonate to the comonomer charge increases the water-resistance of the dry film product. From a comparison of Examples 7, 11, and 13 it will also be seen that the optimum amount of sodium styrenesulfonate to provide maximum water resistance increases with increase in amounts of conventional emulsifier within the defined limits: (excerpted from Table 4).

| Example | Sodium Styrenesulfonate | Anionic Emulsifier | ΔT |
|---|---|---|---|
| 7 | 1.0 | none | 0.0 |
| 11 | 2.0 | 0.1 | 0.5 |
| 13 | 3.0 | 2.64 | 1.0 |

The foam-forming tendencies of some of these latexes were quantitatively measured in the following manner. Foam was generated by shaking 180 ml. of the latex in an 8-ounce closed bottle in an up-and-down pumping action for 10 seconds, after which the latex was allowed to stand quietly. The time, in minutes after shaking was stopped, for the foam to drain and foam-free liquid surface to appear on the latex was taken as the "Foam Drainage Time" shown in Table 5. For comparison, the control run was carried out like Examples 7 and 11 but with 5 parts by weight of the sulfated mixture of lauryl and myristyl alcohols, sodium salt, 66 percent assay, containing sodium sulfate and without any added sodium styrenesulfonate.

TABLE 5

| Example | Anionic Emulsifier | Sodium Styrene-sulfonate | p | Foam Drainage Time, mins. |
|---|---|---|---|---|
| Control | 5.0 | none | 4.6 | 16 |
| 7 | none | 1.0 | 6.5 | 0.3 |
| 11 | 0.1 | 2.0 | 4.4 | 0.7 |

It will be noted that the latex products had comparable mechanical stabilities (p values), but the products of Examples 7 and 11 were practically non-foaming.

*Examples 35–39*

Aqueous emulsion polymerizations were carried out on the charges shown in Table 6 by heating with agitation at 70° C., under a nitrogen atmosphere, until polymerization was substantially complete. The latex products were strained to remove a small amount of coagulum. The strained latexes were steam distilled at atmospheric pressure until an equal volume of water was removed. The steamed latex was cooled and again strained; the formed sludge and skin were negligible.

The mechanical stabilities and foaming tendencies of the latex products were measured by placing 200 ml. of such product in a 1-quart cylindrical container and subjecting the same to vigorous agitation on a Hamilton-Beach malted milk mixer. Each of the latexes survived 30 minutes of such agitation without appreciable coagulation. The volume of foam above the liquid level immediately following cessation of such stirring was taken as a measure of the foaming tendency and is also recorded in Table 6.

The control test was carried out without any added sodium styrenesulfonate. The control polymerization was carried out on the following charge, parts being by weight:

Water _____ 100
Sulfated mixture of lauryl and myristyl alcohols,
  sodium salt _____ 0.7
Potassium persulfate _____ 1.4
Sodium bicarbonate _____ 1.0
Styrene _____ 60
1,3-butadiene _____ 40

Polymerization was at 70° C. until substantially complete. After the polymerization, there was added to the latex 0.75 part of an alkylarylsulfonate surfactant in order to stabilize the reactor latex sufficiently to permit steam distillation without coagulation. After steam distillation it was necessary to add approximately 2.5 parts of a polyglycol ether alcohol non-ionic emulsifier to provide 30-minute stability in the Hamilton-Beach test. As Table 6 shows, the resulting control latex was very foamy. In contrast thereto, the latexes that were prepared in accordance with this invention (Examples 35–39) were relatively non-foaming.

The moisture vapor transmission rates and tensile strength values were measured on dried films from the latex products of Examples 35 and 36 (and, for contrast therewith, from the control latex) with the results shown in Table 7.

The moisture vapor transmission rate values were determined as follows. A uniform layer of the latex was applied to one side of 35-pound high density bleached kraft paper in amount corresponding to approximately 3.92 grams of polymer per square foot after drying at 180° F. for five minutes. The dry coated paper, coated side out, was sealed over a 3.5-inch diameter crystallizing dish containing 25 grams of anhydrous calcium chloride. The assembly was exposed in a humidity cabinet at 90 percent relative humidity and 100° F., the gains in weight being observed after 16, 40, and 64 hours, from which the moisture vapor transmission rates in grams per 100 in.$^2$ per 24 hours were calculated as shown in Table 7.

The tensile strength values were obtained in the following way. A thin, uniform layer of the latex was cast on a glass plate and dried to obtain a film about 10 mils thick which was carefully lifted from the casting plate. From the film were cut dumbbell-shaped specimen strips having an approximately 2-inch intermediate portion 0.5 inch wide. These strips were conditioned for 16 hours at 75° F. and 50 percent relative humidity and were then pulled in an Instron Tensile Tester at a jaw separation speed of 20 inches per minute. The tensile strength values at break, calculated in pounds per square inch of original cross-section, are shown in Table 7.

TABLE 7

| Example | Moisture Vapor Transmission Rate | Tensile Strength, p.s.i. |
|---|---|---|
| Control | 19.0 | 1,095 |
| 35 | 4.5 | 2,110 |
| 36 | 6.5 | 2,080 |

It will be seen that the moisture vapor transmission rates were lower, and the tensile strength values higher, for the products of the invention (Examples 35 and 36) than for the control.

*Examples 40–46*

Aqueous emulsion polymerizations were carried out on the charges shown in Table 8. The aqueous solution of the ingredients other than the monomeric portion was agitated at 40° C. under an atmosphere of nitrogen while the premixed monomer portion was added at an average rate of approximately 14 percent per hour.

The resulting latexes were free of coagulum and could be steam distilled without formation of sludge and skin. The latexes withstood 30 minutes of agitation in the Hamilton-Beach test without coagulation and all were low-foaming.

TABLE 6

| Example | Water, pounds | Styrene, pounds | ar-Methyl-styrene, pounds | 1,3-Butadiene, pounds | Surfactant [1], grams | Surfactant [2], grams | Potassium persulfate, grams | Sodium bicarbonate, grams | Sodium styrenesulfonate, grams | Foam Volume, mls. |
|---|---|---|---|---|---|---|---|---|---|---|
| 35 | 125 | 75 | | 45 | 14.2 | | 283 | 198 | 340 | <50 |
| 36 | 50 | 30 | | 20 | | 150 | 331 | 232 | 681 | 200 |
| 37 | 125 | | 62.5 | 62.5 | 14.2 | | 283 | 198 | 340 | <50 |
| 38 | 50 | 10 | | 40 | | 150 | 331 | 232 | 681 | <50 |
| 39 | 50 | 5 | | 45 | | 150 | 331 | 232 | 681 | <50 |
| Control [3] | | | | | | | | | None | 600 |

[1] Sulfated mixture of lauryl and myristyl alcohols, sodium salt, 91 percent assay.
[2] Sulfated mixture of lauryl and myristyl alcohols, sodium salt, 66 percent assay, containing sodium sulfate.
[3] Control containing no sodium styrenesulfonate.

TABLE 8

Water _____pounds__ 64
Surfactant, sodium alkylaryl-sulfonte,
  92% active _____grams__ 656
Cumene hydroperoxide _____do____ 41
Acetic acid, glacial _____do____ 16
Sodium sulfoxylate formaldehyde _____do____ 16
Sodium styrenesulfonate _____do____ 163
Monomeric portion _____pounds__ 36

| Example | 40 | 41 | 42 | 43 | 44 | 45 | 46 |
|---|---|---|---|---|---|---|---|
| Styrene, percent | 70 | 60 | 10 | 70 | 60 | | 80 |
| 1,3-butadiene, percent | 30 | 25 | 40 | 30 | 40 | 50 | 20 |
| Acrylonitrile, percent | | 15 | 50 | | | 50 | |

In place of the sulfonic acid comonomers used in the preceding specific examples, other water-soluble salts of ar-monovinyl aromatic hydrocarbon sulfonic acid of the kinds hereinbefore defined are used with substantially the same results. For instance, the sodium, potassium, calcium, ammonium, and triethylammonium salts of styrenesulfonic acid are used with substantially the same results. In Example 1 all or part of the styrene is replaceable with ar-vinyltoluene, ar-vinylxylene, ar-chlorostyrene, ar,ar-dichlorostyrene, and analogous styrene monomers.

*Examples 47–62*

By the procedure whose steps and conditions are set forth in Example 1, latexes are made from polymerization charges whose compositions are set forth in Tables 9 and 10. After polymerization to practical completion, stable latexes of the corresponding polymers are obtained.

TABLE 9

|  | Grams |
|---|---|
| Water | 1584 |
| Surfactant (sulfated mixture of lauryl and myristyl alcohols, sodium salt, containing $Na_2SO_4$) | 6.6 |
| Potassium persulfate | 13.2 |
| Sodium bicarbonate | 9.5 |
| ar-Monovinyl aromatic sulfonic acid salt (Table 10) | Variable |
| Monomer (Table 10) | 1000 |

TABLE 10

| Example | Monomer grams | ar-Monovinylaromatic Sulfonic acid salt, grams |
|---|---|---|
| 47 | Styrene, 600 1,3-butadiene, 400. | Potassium VBS (p-vinylbenzyl sulfonate) 27.[1] |
| 48 | do | Calcium VBS, 27.[1] |
| 49 | do | Ammonium VBS, 24.[1] |
| 50 | do | Triethylammonium VBS, 33.[1] |
| 51 | do | Potassium SS (styrenesulfonate) 15.5.[2] |
| 52 | do | Calcium SS, 16.[2] |
| 53 | do | Ammonium SS, 14.5.[2] |
| 54 | do | Triethylammonium SS, 21.[2] |
| 55 | ar-Vinyltoluene, 600; 1,3-butadiene, 400. | Sodium SS, 25. |
| 56 | ar-Vinylxylene, 600; 1,3-butadiene, 400. | Do. |
| 57 | Styrene, 500; Isoprene, 500 | Do. |
| 58 | Styrene, 600; 1,3-butadiene, 250; Acrylonitrile, 150; Methacrylic Acid, 20; Divinylbenzene, 10. | Do. |
| 59 | ar-Vinyltoluene, 400; 1,3-butadiene, 400; Methyl isopropenyl ketone, 200. | Do. |
| 60 | Vinyl acetate, 500; Vinyl chloride, 500. | Do. |
| 61 | Styrene, 600; 1,3-butadiene, 400. | Sodium ar-methylstyrenesulfonte, 25. |
| 62 | Styrene, 700; 1,3-butadiene, 300. | Sodium ar-chlorostyrenesulfonate, 25. |

[1] Approximately 2.5 weight percent calculated as sodium salt based on weight of polymer at 100% conversion.
[2] Approximately 1.5 weight percent calculated as sodium salt based on weight of polymer at 100% conversion.

The latexes which are film-forming and whose dried films are resistant to water are particularly useful as or in the preparation of coating compositions. When such latexes are spread in thin layers on solid surfaces, e.g. of wood, glass, metals, paper, fabric, plaster, masonry, etc., and the latex is dried by evaporation of water, the residual films are adherent and coherent. Prior to use, the latexes can be compounded with usual additives such as pigments and fillers to enhance the appearance and utility of the coatings and coated articles. These latexes are also useful in making self-supporting sheet and film goods which are strong and more water-resistant than products from conventional latexes.

The latexes of polymers which are not film-forming per se can be plasticized to render them film-forming or they can be used advantageously in other ways. They are useful in blends with film-forming latexes of soft polymers to increase the hardness of the latter. They are also useful in impregnating fabrics, e.g. for making box toes and counters for shoes, wherein the dried polymer is fused into desired shape.

In all of these applications and uses, the mechanical stability and low foam characteristic of the new latexes are advantageous.

What is claimed is:

1. An emulsion polymerization method for making a synthetic aqueous latex which is non-foaming, mechanically stable, and non-sensitive to coagulation by electrolytes and which, when dried in a thin layer, deposits a coherent solid film which is resistant to water and has a low moisture vapor transmission rate, which method is carried out by agitating and heating at a polymerization temperature in the substantial absence of air a mixture of from 0.5 to 3 parts by weight of a sodium ar-monovinyl aromatic sulfonate and from 99.5 to 97 parts by weight of a mixture of from 10 to 70 percent by weight of styrene and from 90 to 30 percent by weight of 1,3-butadiene, together with water and a free-radical-generating catalyst and less than 5 weight percent of water-soluble non-polymerizable non-cationic surfactant based on the combined weight of the polymerizable monomers, there being from 0.5 to 1.5 parts by weight of the said sodium monovinyl aromatic sulfonate when there is no water-soluble non-polymerizable surfactant present in the polymerization reaction mixture.

2. A synthetic aqueous latex which is non-foaming, mechanically stable, and non-sensitive to coagulation by electrolytes and which, when dried in a thin layer, deposits a coherent solid film which is resistant to water and has a low moisture vapor transmission rate, which latex is an aqueous colloidal dispersion of a solid film-forming copolymer of from 0.5 to 3 parts by weight of a sodium ar-monovinyl aromatic sulfonate and from 99.5 to 97 parts by weight of a mixture of from 10 to 70 percent by weight of styrene and from 90 to 30 percent by weight of 1,3-butadiene, and which latex contains less than 5 weight percent of water-soluble non-polymerizable surfactant based on the weight of the copolymer, there being from 0.5 to 1.5 parts by weight of the said sodium ar-monovinyl aromatic sulfonate in the said copolymer when there is no water-soluble non-polymerizable surfactant present in the said latex.

References Cited by the Examiner

UNITED STATES PATENTS

| 2,914,499 | 11/1952 | Sheetz | 260—29.7 |
| 2,971,935 | 2/1961 | Floria | 260—29.6 |
| 2,971,947 | 2/1961 | Floria et al. | 260—29.6 |

MURRAY TILLMAN, *Primary Examiner.*

LEON J. BERCOVITZ, *Examiner.*

E. B. WOODRUFF, W. J. BRIGGS,
*Assistant Examiners.*